US012681473B2

(12) United States Patent
Kawanai et al.

(10) Patent No.: US 12,681,473 B2
(45) Date of Patent: Jul. 14, 2026

(54) APPARATUS AND METHOD FOR MANAGING TRAVEL OF VEHICLE HAVING AUTONOMOUS TRAVEL FUNCTION, AND NON-TRANSITORY COMPUTER-READABLE STORAGE MEDIUM

(71) Applicant: TOYOTA JIDOSHA KABUSHIKI KAISHA, Toyota (JP)

(72) Inventors: Taichi Kawanai, Susono (JP); Yusuke Hayashi, Susono (JP); Daichi Hotta, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 126 days.

(21) Appl. No.: 18/352,481

(22) Filed: Jul. 14, 2023

(65) Prior Publication Data

US 2024/0069541 A1     Feb. 29, 2024

(30) Foreign Application Priority Data

Aug. 23, 2022     (JP) ................................. 2022-132681

(51) Int. Cl.
*G05D 1/00*          (2024.01)
*B60W 60/00*        (2020.01)

(52) U.S. Cl.
CPC ......... *G05D 1/0022* (2013.01); *B60W 60/001* (2020.02); *B60W 2554/4041* (2020.02); *B60W 2556/45* (2020.02)

(58) Field of Classification Search
CPC .... G05D 1/0022; G05D 1/0027; G05D 1/227; G05D 1/226; G05D 1/2247;
(Continued)

(56) References Cited

U.S. PATENT DOCUMENTS 8,996,224 B1 * 3/2015 Herbach ............ B60W 60/0011
2017/0334442 A1 * 11/2017 Sakai ..................... G08G 1/166
(Continued)

FOREIGN PATENT DOCUMENTS

DE      102018215289 A1 * 3/2020
JP         2019185279 A * 10/2019
(Continued)

OTHER PUBLICATIONS

Machine translation of DE 102018215289 A1 (Year: 2020).*

*Primary Examiner* — Ellis B. Ramirez
(74) *Attorney, Agent, or Firm* — Sughrue Mion, PLLC

(57)          ABSTRACT

The present disclosure provides to an apparatus for managing travel of a vehicle having an autonomous travel function. The apparatus executes the following steps. The apparatus sequentially acquires sensor information from a recognition sensor mounted on the vehicle. The apparatus sequentially generates prediction information showing a position of an object at a future time point based on the sensor information acquired sequentially. The apparatus transmits a remote support request to a remote support operator. The apparatus receives a remote support given in response to the remote support request by the remote support operator. The apparatus makes the vehicle autonomously travel in accordance with the remote support in response to confirming that an actual position of an object obtained from sensor information and a predicted position of an object obtained from prediction information correspond.

7 Claims, 13 Drawing Sheets

(58) Field of Classification Search
CPC .......... G05D 2107/13; G05D 2109/10; B60W
40/08; B60W 60/001; B60W 2554/4041;
B60W 2556/45
USPC .............. 701/23, 26, 2; 340/426.13, 426.14;
705/7.12, 7.13, 7.15, 7.16
See application file for complete search history.

(56) References Cited

U.S. PATENT DOCUMENTS

| | | | | |
|---|---|---|---|---|
| 2018/0074490 A1* | 3/2018 | Park | ..................... | G05D 1/0027 |
| 2018/0196437 A1* | 7/2018 | Herbach | .............. | G05D 1/0231 |
| 2018/0364702 A1* | 12/2018 | Liu | ......................... | G07C 5/008 |
| 2019/0042859 A1* | 2/2019 | Schubert | ................. | G05D 1/00 |
| 2020/0047773 A1* | 2/2020 | Akaba | ............... | B60W 60/0053 |
| 2020/0225659 A1* | 7/2020 | Lockwood | ............. | G08G 1/164 |
| 2020/0282980 A1* | 9/2020 | Kinoshita | ............ | G05D 1/0027 |
| 2020/0293065 A1* | 9/2020 | Pedersen | .............. | G05D 1/0212 |
| 2020/0377092 A1* | 12/2020 | Torres | ................... | B60W 60/00 |
| 2021/0407283 A1* | 12/2021 | Toyokita | ............... | G06Q 50/26 |
| 2022/0254166 A1* | 8/2022 | Sasaki | ............. | B60W 60/00274 |
| 2023/0192129 A1* | 6/2023 | Winter | ................ | G05D 1/0038 |

FOREIGN PATENT DOCUMENTS

| | | |
|---|---|---|
| JP | 2021-71783 A | 5/2021 |
| JP | 2021-163323 A | 10/2021 |

* cited by examiner

APPARATUS AND METHOD FOR MANAGING TRAVEL OF VEHICLE HAVING AUTONOMOUS TRAVEL FUNCTION, AND NON-TRANSITORY COMPUTER-READABLE STORAGE MEDIUM

CROSS-REFERENCE TO RELATED APPLICATION

The present application claims priority under 35 U.S.C. § 119 to Japanese Patent Application No. 2022-132681, filed Aug. 23, 2022, the contents of which application are incorporated herein by reference in their entirety.

BACKGROUND

Field

The present disclosure relates to a technique for managing travel of a vehicle having an autonomous travel function.

Background Art

About an autonomous driving vehicle, a travel route is generated based on information acquired from a sensor or the like mounted on the vehicle, and the vehicle is automatically driven in accordance with the generated travel route. However, there may be a situation in which the vehicle cannot determine whether an operation according to the travel route can be performed or not, for example, under a situation in which other vehicles around the vehicle are moving complicatedly. A technique for requesting determination or an instruction from a remote support operator in a different area from the vehicle and determining an operation of the vehicle in accordance with the determination or the instruction from the remote support operator in such a situation is known. The determinations or the instruction transmitted to the vehicle from the remote support operator may be referred to as a remote support.

JP2021-163323A discloses an example of a prior art related to the remote support. According to the prior art disclosed in JP2021-163323A, a driving support request device which communicates with a driving support device that remotely supports driving of a vehicle is mounted on the vehicle which performs autonomous driving. The driving support request device detects an object around the vehicle. Then, based on a position of the object and a result of predicting future motion of the object, the driving support request device determines whether to request a driving support from the driving support device or not. When it is determined to request the driving support, a request message and information showing the object are transmitted to the driving support device. The driving support request device and the driving support device communicate with each other via a communication network.

As a document showing the technical level of the technical field related to the present disclosure, JP2021-071783A can be exemplified in addition to JP2021-163323A.

SUMMARY

As disclosed in JP2021-163323A, in a system for remote support of a vehicle, information is transmitted and received between a device in the vehicle and a device at a remote support operator by communication via a communication network. Therefore, delay occurs in transmission and reception of information when a request for a remote support is transmitted from the vehicle to the remote support operator and when the remote support is transmitted from the remote support operator to the vehicle. If the delay becomes large, there is a possibility that a situation around the vehicle changes greatly from the time when the vehicle requests the remote support until the time when the vehicle receives the remote support as a response to the request and the situation becomes greatly different from the situation recognized by the remote support operator. In such a case, it cannot be said that the remote support input by the remote support operator is an effective support.

The present disclosure is made in view of the above-described problems. An object of the present disclosure is to provide a technique capable of reducing influence of delay occurring between a device on a vehicle and a device at a remote support operator and appropriately coping with the delay occurring when the vehicle is remotely supported.

A first aspect of the present disclosure relates to an apparatus that manages travel of a vehicle.

The travel management apparatus includes one or more memories storing one or more programs and one or more processors coupled with the one or more memories.

The one or more programs are configured to cause the one or more processors to execute:

sequentially acquiring sensor information from a recognition sensor mounted on the vehicle;

sequentially generating prediction information showing a position of a peripheral object at a future time point based on the sensor information acquired sequentially, the peripheral object being an object existing around the vehicle;

transmitting a remote support request to a remote support operator;

receiving a remote support given in response to the remote support request by the remote support operator; and making the vehicle autonomously travel in accordance with the remote support in response to confirming that a position of a peripheral object obtained from sensor information acquired at a determination time point and a position of a peripheral object obtained from prediction information whose future time point is the determination time point correspond to each other, the determination time point being equal to or later than a time point at which the remote support is received.

A second aspect of the present disclosure relates to a method for managing travel of a vehicle having an autonomous travel function.

The method includes:

sequentially acquiring sensor information from a recognition sensor mounted on the vehicle;

sequentially generating prediction information showing a position of a peripheral object at a future time point based on the sensor information acquired sequentially, the peripheral object being an object existing around the vehicle;

transmitting a remote support request to a remote support operator;

receiving a remote support given in response to the remote support request by the remote support operator; and making the vehicle autonomously travel in accordance with the remote support in response to confirming that a position of a peripheral object obtained from sensor information acquired at a determination time point and a position of a peripheral object obtained from prediction information whose future time point is the determination time point correspond to each other, the determination time point being equal to or later than a time point at which the remote support is received.

A third aspect of the present disclosure relates to a program for managing travel of a vehicle having an autonomous travel function. The program causes a computer to execute the method according to the second aspect. The program according to the third aspect may be stored in a non-transitory computer-readable storage medium or may be provided via a network.

According to the remote support technique of the present disclosure, it is confirmed whether the remote support is effective or not before the vehicle is controlled in accordance with the remote support. As a result, it is possible to reduce influence of delay occurring between a device on the vehicle and a device at the remote support operator and to appropriately cope with the delay occurring when the vehicle is remotely supported.

BRIEF DESCRIPTION OF THE DRAWINGS

FIG. 6 is a diagram illustrating an example of a scene in which traffic states correspond.

FIG. 7 is a diagram illustrating an example of a scene in which the traffic states do not correspond.

FIG. 8 is a diagram illustrating another example of a scene in which the traffic states do not correspond.

DETAILED DESCRIPTION

An embodiment of the present disclosure is described with reference to the accompanying drawings.

1. Configuration of Remote Support System

Figure 1:
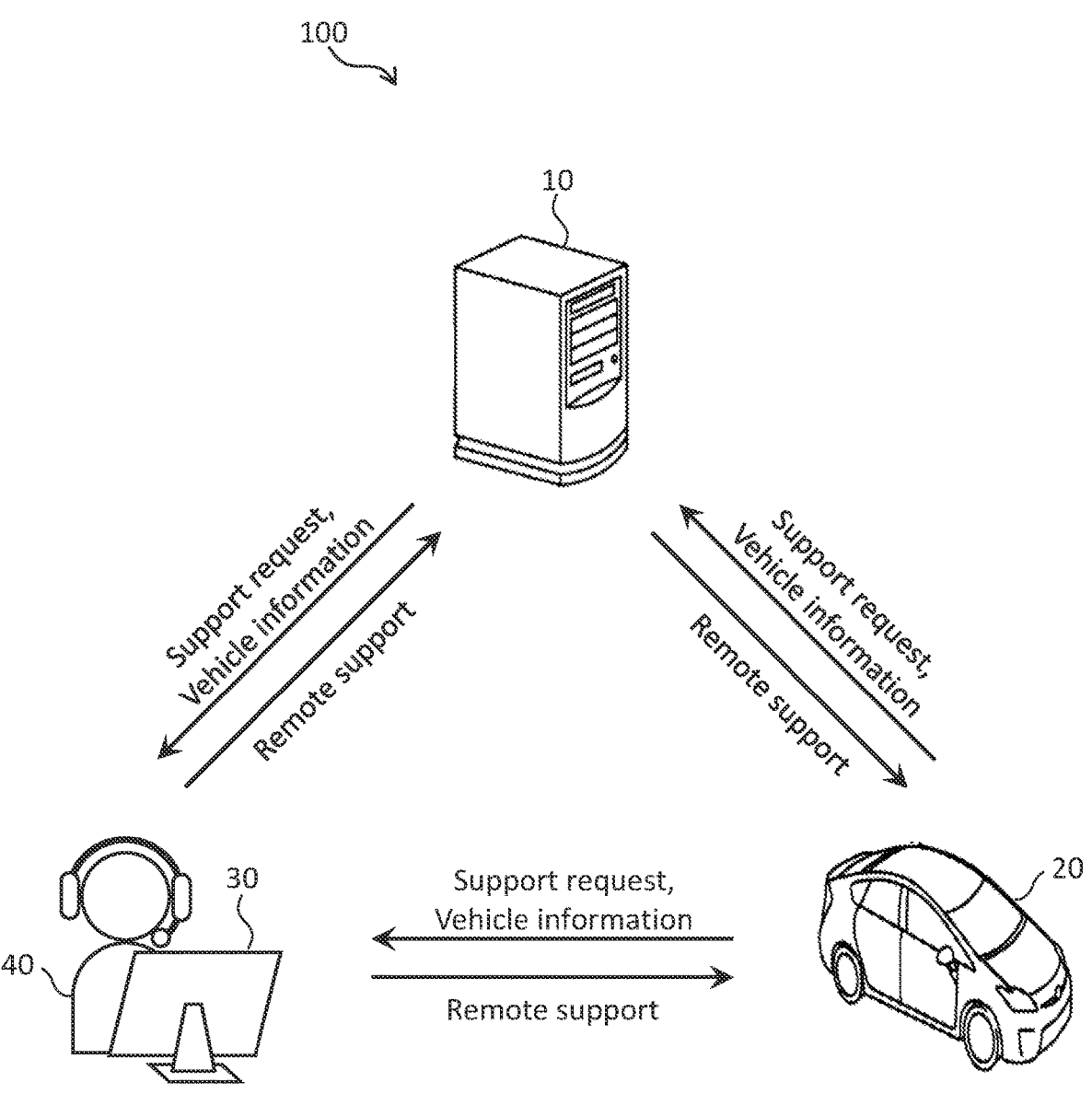
FIG. 1 is a diagram illustrating an example of a configuration of a remote support system.

A travel management apparatus according to the embodiment of the present disclosure manages travel of an autonomous driving vehicle which is a target of a support by a remote support system. A configuration of the remote support system is described with reference to FIG. 1. A remote support system 100 is a system for supporting autonomous driving of an autonomous driving vehicle 20, which has an autonomous travel function, by remote operation of a remote support operator 40. The remote support operator 40 is an operator who remotely supports the autonomous driving vehicle 20 and is also referred to as a remote operator. Autonomous driving of level 4 or level 5 is assumed as the autonomous driving level of the autonomous driving vehicle 20, for example. Hereinafter, the autonomous driving vehicle 20 is simply referred to as the vehicle 20.

The remote support operator 40 uses a remote support terminal 30 to remotely support the vehicle 20. The remote support terminal 30 is connected with a server 10 of a management center via a communication network including the Internet. The vehicle 20 is also connected with the server 10 of the management center via a communication network including 4G or 5G. A plurality of remote support terminals 30 and a plurality of vehicles 20 are connected with the server 10. When receiving a remote support request from the vehicle 20, the server 10 selects a person who takes charge of the remote support out of available remote support operators 40 and connects the remote support terminal 30 assigned to the selected remote support operator 40 with the vehicle 20 which requests the remote support. The remote support terminal 30 assigned to the selected remote support operator 40 and the vehicle 20 may be directly connected instead of being connected via the server 10 after the remote support operator 40 to take charge of the remote support is selected.

As examples of a scene in which the vehicle 20 requests remote support, a scene of overtaking a preceding vehicle, a scene of passing through a crosswalk, a scene of turning right at an intersection, and a scene of avoiding an obstacle by deviating from a lane, are described. In the remote support, at least a part of determination for autonomous driving of the vehicle 20 is performed by the remote support operator 40. Basic calculations related to perception, judgment, and operation required for the driving are performed in the vehicle 20. The remote support operator 40 determines how the vehicle 20 should drive based on information transmitted from the vehicle 20 and transmits an instruction to the vehicle 20 based on the result of the determination. Examples of the instruction for the remote support transmitted from the remote support operator 40 to the vehicle 20 include an instruction to move and an instruction to stop. Other examples of the instruction for remote support include an instruction to enter the intersection, an instruction to pass through the crosswalk, and an instruction to overtake the preceding vehicle.

Figure 2:
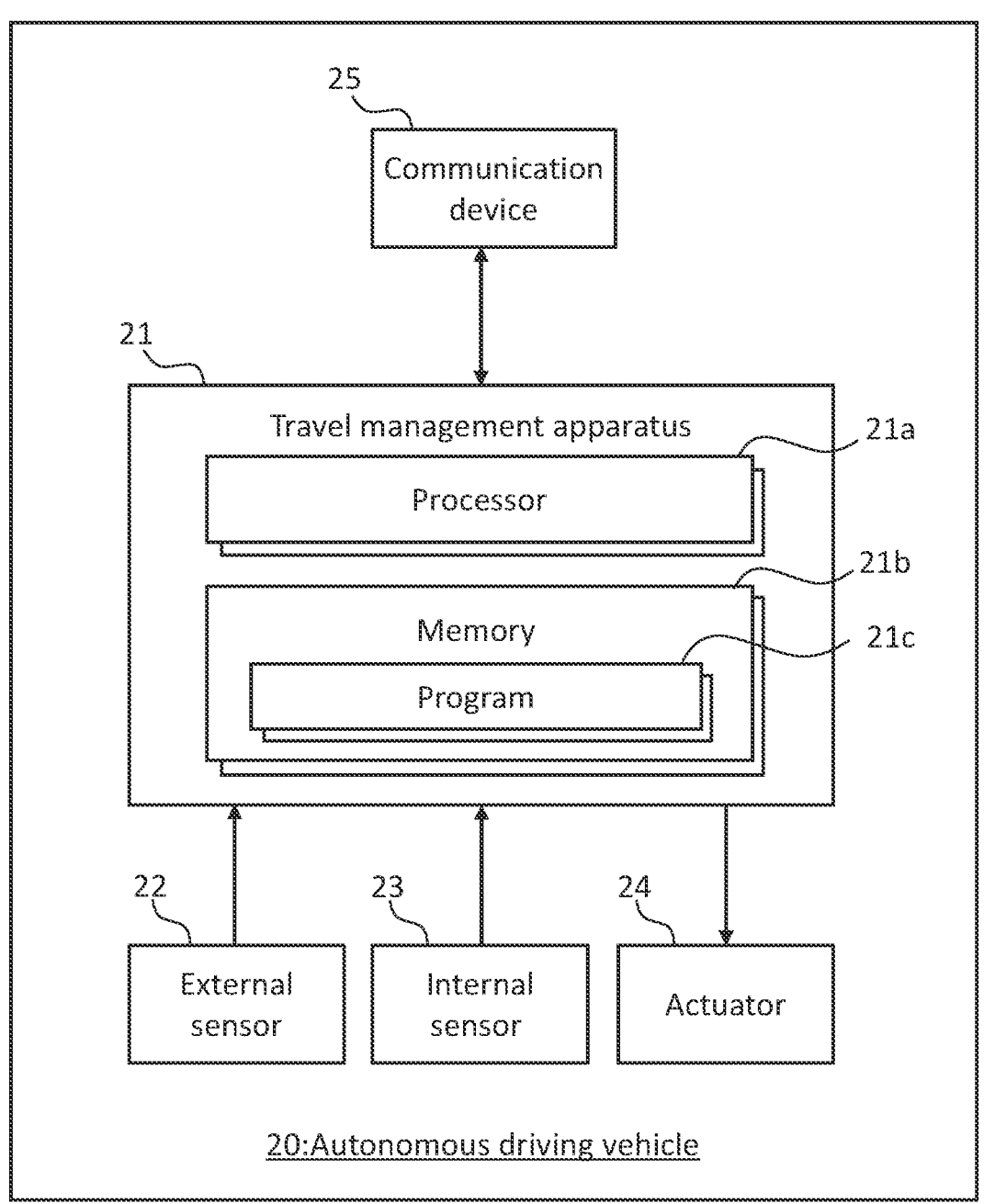
FIG. 2 is a block diagram illustrating an example of a configuration of an autonomous driving vehicle.

FIG. 2 is a block diagram illustrating an example of a configuration of the vehicle 20. The vehicle 20 comprises a travel management apparatus 21 according to the embodiment of the present disclosure. The travel management apparatus 21 manages travel of the vehicle 20 by the autonomous travel function and includes a plurality of electronic control units (ECUs). The vehicle 20 comprises an external sensor 22, an internal sensor 23, an actuator 24, and a communication device 25. These are connected to the travel management apparatus 21 via an in-vehicle network such as a controller area network (CAN).

The travel management apparatus 21 includes one or more processors 21a (hereinafter, simply referred to as a processor 21a) and one or more memories 21a (hereinafter, simply referred to as a memory 21b) coupled with the processor 21b. The processor 21a may be, for example, a central processing unit (CPU), a field-programmable gate array (FPGA), an application-specific integrated circuit (ASIC), or another processing unit, or may be a combination of two or more of a CPU, an FPGA, an ASIC, or another processing unit. The memory 21b stores a plurality of programs 21c (hereinafter, simply referred to as a program 21c) executable by the processor 21a and various pieces of information related thereto. The program 21c includes a plurality of executable instructions.

By the processor 21a executing the program 21c, various processes executed by the processor 21a are realized. The program 21c includes an autonomous driving program for realizing autonomous driving. By the processor 21a executing the autonomous driving program, processing for autonomous driving of the vehicle 20 is executed. The program 21c also includes a remote support program for receiving remote support. By the processor 21a executing the remote support program, processes are executed for requesting a support from the server 10 and making the vehicle 20 follow the support received from the remote support terminal 30 directly or via the server 10.

The external sensor 22 includes a recognition sensor and a position sensor. The recognition sensor acquires information for recognizing a situation around the vehicle 20. The recognition sensor includes a camera which acquires an image by capturing around the vehicle 20, in particular, capturing ahead of the vehicle 20. Examples of the recognition sensor other than the camera include a laser imaging detection and ranging (LiDAR) and a millimeter wave radar. The position sensor detects a position and orientation of the vehicle 20. As the position sensor, a global positioning system (GPS) sensor is exemplified.

Sensor information, which is acquired from the recognition sensor, and position information, which is acquired from the position sensor, are sequentially acquired by the travel management apparatus 21. Using information related to the situation around the vehicle 20 acquired from these external sensors 22, the travel management apparatus 21 predicts how surrounding environment around the vehicle 20 changes during a short period. Then, the travel management apparatus 21 generates a travel plan of the vehicle 20 based on the predicted information and a target route determined by, for example, a navigation system. The travel plan includes a target position of the vehicle 20 and a target velocity or a target acceleration at the target position. The travel management apparatus 21 controls the vehicle 20 so that the vehicle 20 travels in accordance with the travel plan, and thereby autonomous driving of the vehicle 20 is performed.

The internal sensor 23 includes a state sensor which acquires information about motion of the vehicle 20. Examples of the state sensor include a wheel speed sensor, an acceleration sensor, an angular velocity sensor, and a steering angle sensor. The acceleration sensor and the angular velocity sensor may be IMUs. Information obtained by the internal sensor 23 is sequentially acquired by the travel management apparatus 21.

The actuator 24 includes a steering device for steering the vehicle 20, a driving device for driving the vehicle 20, and a braking device for braking the vehicle 20. The steering device includes, for example, a power steering system, a steer-by-wire steering system, and a rear wheel steering system. The driving device includes, for example, an engine, an EV system, and a hybrid system. The braking device includes, for example, a hydraulic brake and an electric regenerative brake. The actuator 24 is operated by a control signal transmitted from the travel management apparatus 21.

The communication device 25 controls wireless communication between the vehicle 20 and the outside. The communication device 25 communicates with the server 10 and the remote support terminal 30 via a communication network. Information processed by the travel management apparatus 21 is transmitted to the server 10 or the remote support terminal 30 using the communication device 25. Information processed by the server 10 or the remote support terminal 30 is acquired by the travel management apparatus 21 using the communication device 25. In addition, when vehicle-to-vehicle communication with another vehicle or road-to-vehicle communication with an infrastructure is required for autonomous driving, communication with these outside devices is also performed by the communication device 25.

Figure 3:
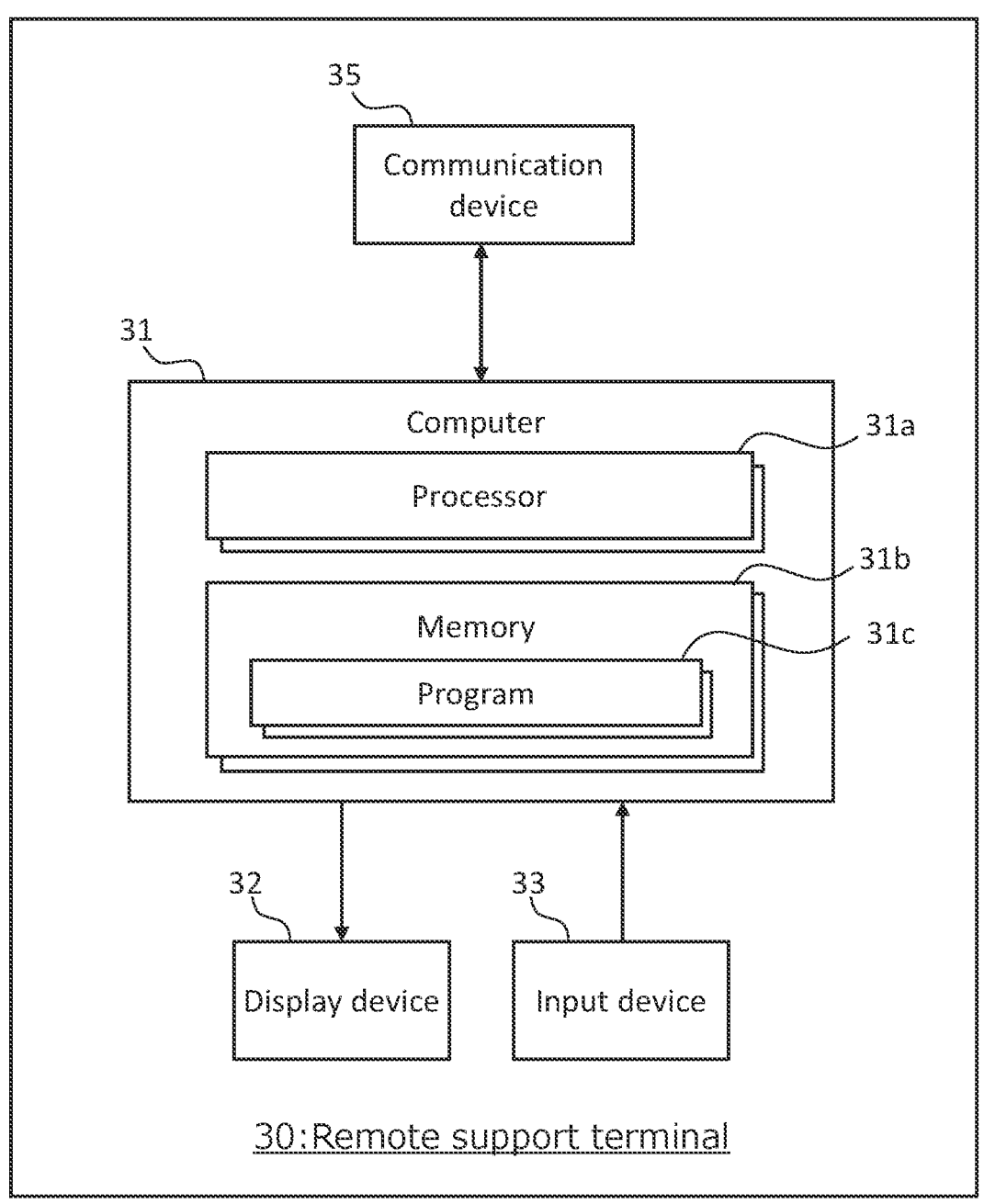
FIG. 3 is a block diagram illustrating an example of a configuration of a remote support terminal.

FIG. 3 is a block diagram illustrating an example of a configuration of the remote support terminal 30. The remote support terminal 30 comprises a computer 31, a display device 32, an input device 33, and a communication device 35. The display device 32, the input device 33, and the communication device 35 are connected with the computer 31. The remote support terminal 30 may be installed in the management center or may be installed outside the management center, for example, at the remote support operator 40's home.

The computer 31 comprises one or more processors 31a (hereinafter, simply referred to as a processor 31a) and one or more memories 31b (hereinafter, simply referred to as a memory 31b) coupled with the processor 31a. The processor 31a may be, for example, a CPU, an FPGA, an ASIC, or another processing unit, or may be a combination of two or more of a CPU, an FPGA, an ASIC, or another processing unit. The memory 31b stores one or more programs 31c executable by the processor 31a (hereinafter, simply referred to as a program 31c) and various pieces of information related thereto. The program 31c includes a plurality of executable instructions. By the processor 31a executing the program 31c, various processes by the processor 31a are realized.

The display device 32 is a device which displays information necessary for the remote support operator 40 to perform determination related to the remote support. Information for the determination related to the remote support and displayed on the display device 32 includes information acquired by the recognition sensor. Typically, a camera image obtained by the camera capturing around the vehicle 20, in particular, capturing ahead of the vehicle 20 is included. The information displayed on the display device 32 may include information acquired by the external sensor 22 other than the camera image or may include information acquired by the internal sensor 23. These pieces of information are transmitted from the communication device 25 of the vehicle 20 and acquired by the remote support terminal 30.

The input device 33 is a device to which the remote support operator 40 inputs operation for remote support. Information input to the input device 33 is processed by the computer 31 and transmitted to the vehicle 20. Examples of the input device 33 include a button, a lever, and a touch panel. For example, the remote support operator 40 can instruct the vehicle 20 to proceed/stop or enter the intersection/wait to enter the intersection by input using a button.

The communication device 35 controls communication between the remote support terminal 30 and the outside. The communication device 35 communicates with the server 10 and the vehicle 20 via a communication network. Information processed by the computer 31 is transmitted to the server 10 or the vehicle 20 using the communication device 35. Information processed by the server 10 or the vehicle 20 is acquired by the computer 31 using the communication device 35.

2. Overview of Remote Support

Figure 4:
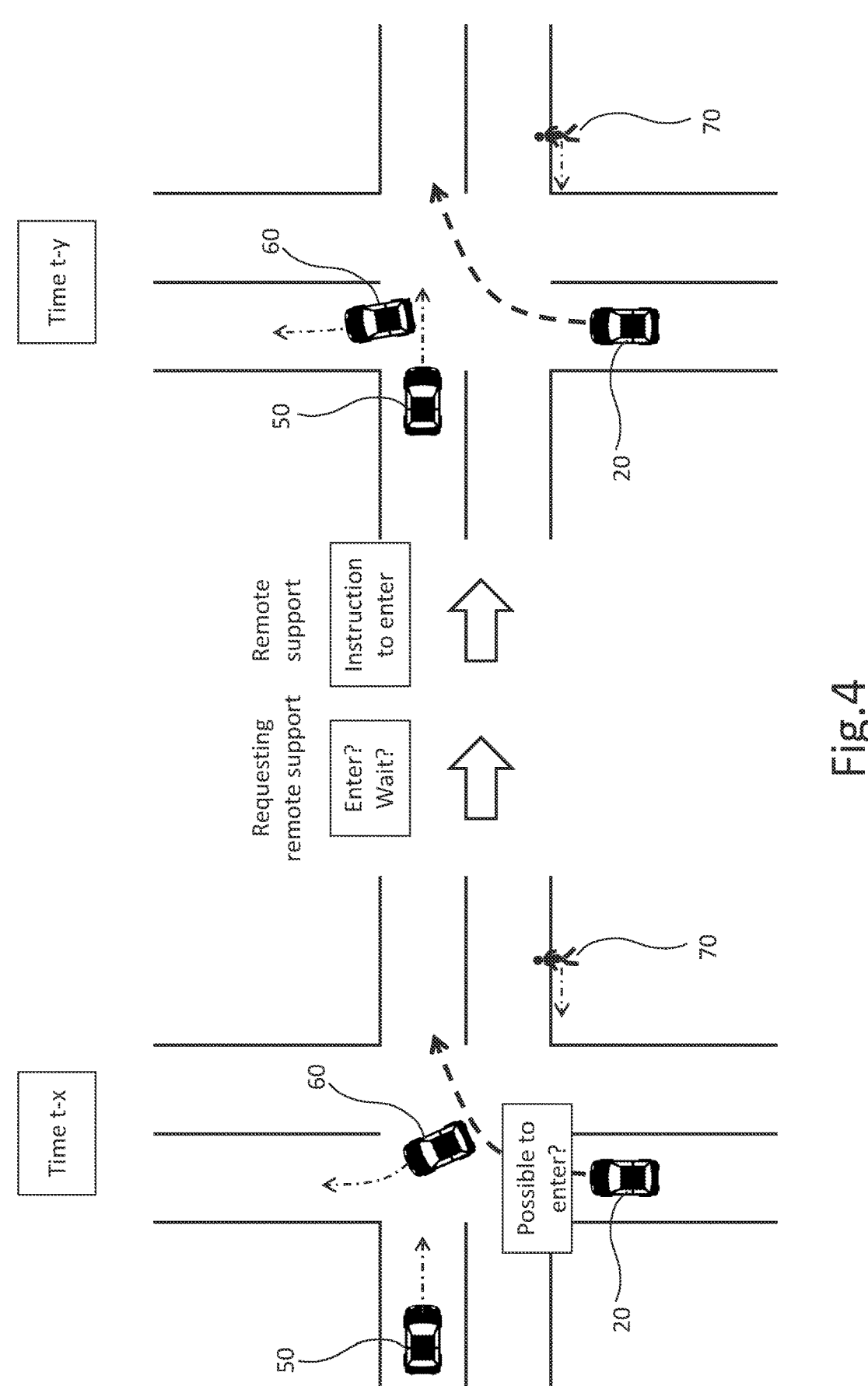
FIG. 4 is a diagram for explaining an outline of a scene in which a remote support is performed.

The Overview of the remote support is described by exemplifying a case in which the vehicle 20 turns right at the intersection. FIG. 4 shows situations of the vehicle 20 at time t-x and time t-y. As moving objects around the vehicle 20, a vehicle 50, which is going straight along a crossing lane, a vehicle 60, which is turning right at the intersection, and a pedestrian 70 are existing around the intersection.

When the vehicle 20 approaches the intersection, a travel management apparatus 21 determines whether the vehicle 20 can enter the intersection or not. If it is determined that the vehicle 20 can enter the intersection, the travel management apparatus 21 makes the vehicle 20 enter the intersection. When the travel management apparatus 21 cannot autonomously determine whether the vehicle 20 can enter the intersection and it is determined that the remote support is necessary, the travel management apparatus 21 requests the remote support. At the time t-x, the travel management apparatus 21 determines that the remote support is necessary and transmits a remote support request. The remote support request is once received by the server 10 and after the remote support operator 40 in charge of supporting the vehicle 20 is assigned, the remote support request is transmitted to the remote support terminal 30. Here, an instruction to enter the intersection or an instruction to wait to enter the intersection is requested as the remote support. At this time, the information for the determination in the remote support by the remote support operator 40, which include the sensor information acquired from the recognition sensor, is also transmitted to the remote support terminal 30 and displayed on the display device 32.

Responding to the remote support request, the remote support operator 40 refers to the information displayed on the display device 32 and inputs remote support into the input device 33. The input remote support is transmitted from the remote support terminal 30 via the communication network and is received by the travel management apparatus 21. Here, remote support instructing the vehicle 20 to enter the intersection is transmitted. Receiving the remote support, the travel management apparatus 21 generates the travel plan for the vehicle 20 to enter the intersection and controls the vehicle 20 so that the vehicle 20 travels in accordance with the travel plan. Thus, the vehicle 20 can turn right at the intersection.

However, when the remote support request and the sensor information are transmitted from the travel management apparatus 21 to the remote support terminal 30 and when the remote support is transmitted from the remote support terminal 30 to the travel management apparatus 21, delay occurs. It is because they are transmitted through the communication network. Therefore, there is a time lag from the time when the travel management apparatus 21 transmits the remote support request until the time when the travel management apparatus 21 receives the remote support answering the request.

The time t-y is time at which the vehicle 20 receives the remote support. Since there is a time lag from the time t-x until the time t-y, the positions of the vehicle 50, the vehicle 60, and the pedestrian 70, which are moving objects around the vehicle 20, are different between the time t-x and the time t-y. Even if the position of the moving object changes like this, if it does not greatly change the situation around the vehicle 20, it is assumed that the remote support is still an effective support at the time t-y. However, if the delay becomes large and thus the situation around the vehicle 20 changes significantly, there is a possibility that the control of the vehicle 20 in accordance with the remote support becomes different from the control intended by the remote support operator 40. In this case, the remote support received by the vehicle 20 cannot be said to be an effective support. It is not desirable, from the viewpoint of smooth traffic and ensuring safety, that the vehicle 20 is operated in accordance with the remote support that is no longer an effective support.

Therefore, when receiving the remote support, the travel management apparatus 21 confirms whether the remote support is still effective at the time of reception before starting to make the vehicle 20 travel according to the remote support. Then, upon confirming that the remote support is effective, the travel management apparatus 21 controls the vehicle 20 so as to travel according to the remote support. In order to confirm that the remote support is effective, the travel management apparatus 21 confirms whether "traffic states" at the time when the remote support is received and at the time when the remote support request is transmitted correspond to each other or not. Then, upon confirming that the traffic states correspond, the travel management apparatus 21 controls the vehicle 20 so as to travel in accordance with the remote support.

3. Generation of Prediction Information

Prediction information is used to determine whether the traffic states correspond or not. The prediction information, which is generated by the travel management apparatus 21, is information showing a future position of the moving object existing around the vehicle 20. The prediction information is sequentially generated based on the sensor information sequentially acquired from the recognition sensor. The moving object detected by the recognition sensor, which is a target of generation of the prediction information by the travel management apparatus 21, may be referred to as a peripheral object. Any moving object existing around the vehicle 20, such as a vehicle, a pedestrian, or a bicycle, can be a peripheral object.

Figure 5:
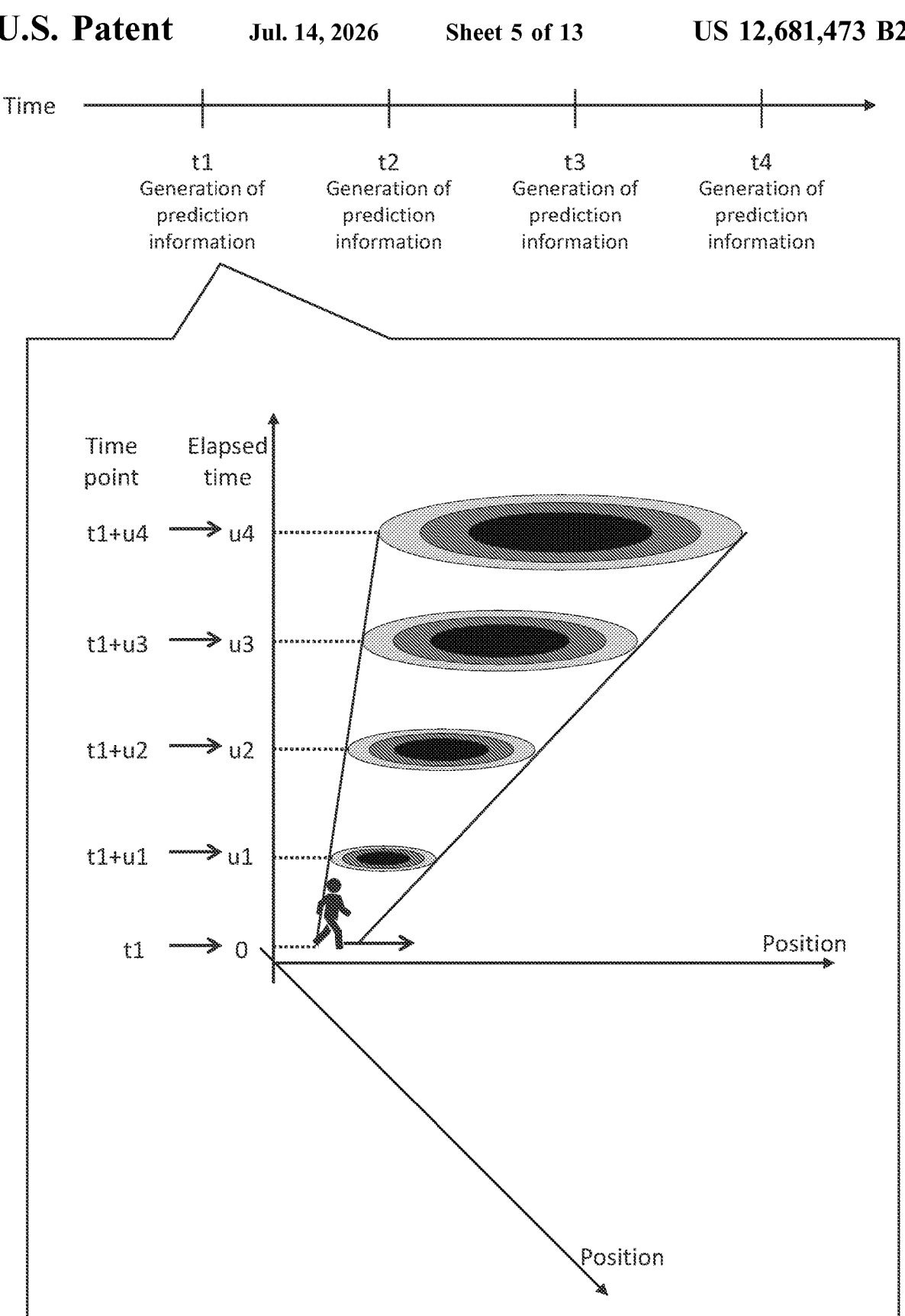
FIG. 5 is a diagram for explaining prediction information generated by a travel management apparatus according to an embodiment of the present disclosure.

The generated prediction information is described with reference to FIG. 5. Here, a pedestrian is detected as a peripheral object, and prediction information showing a future position of the pedestrian is generated. The time t1, t2, t3, and t4 are timings at which the prediction information is generated. In FIG. 5, the prediction information generated at the time t1 is represented by a coordinate system having a time axis. For example, the travel management apparatus 21 detects the position or the moving speed of the pedestrian using the camera or the LiDAR and calculates a position at which the pedestrian is predicted to exist in the future based on the detected information.

In FIG. 5, the prediction information is represented by ellipses painted in gray and shows the position at which the peripheral object is predicted to exist by probability distribution. The ellipse becomes darker as the probability that the peripheral object exists becomes higher. The prediction information may be calculated as the probability distribution like this or may be calculated as a predicted range in which the peripheral object is predicted to exist.

The time u1, u2, u3, and u4 are elapsed time in the prediction information. In other words, time points at which the elapsed time is u1, u2, u3, and u4 correspond to the time t1 plus u1, t1 plus u2, t1 plus u3, and t1 plus u4, respectively.

In this way, the prediction information is calculated as a series of prediction information showing the position of the peripheral object at each time when predetermined time elapses since the prediction information is generated. It is the same to the prediction information generated at the time other than the time t1, and the prediction information generated at the time t2, t3, and t4 are also calculated as a series of the prediction information. An interval of the timing when the prediction information is generated may be the same as or different from an interval of each time in the series of prediction information. That is, for example, an interval between the time t1 and the time t2 and an interval between the time u1 and the time u2 may be the same or different.

Although the prediction information for four frames from the time u1 to the time u4 is calculated in the example of FIG. 5, the number of frames of information calculated as the series of prediction information may be more or less than that. The maximum value of the number of frames for which the prediction information is calculated is determined in consideration of, for example, possible delay time or accuracy of the prediction. For example, if the maximum time during which the sufficient accuracy of prediction is considered to be ensured is 50 seconds, the prediction information including prediction up to 50 seconds ahead may be generated. Alternatively, for example, if the average time of delay obtained from past data is 30 seconds, prediction information including prediction up to 30 seconds ahead may be generated.

Further, the prediction information may be information including prediction of a velocity of the peripheral object in addition to the future position. The calculated prediction information is temporarily stored in the memory 21b.

4. Correspondence or Un-Correspondence of Traffic States

4-1. Overview

Next, determination about correspondence or un-correspondence of the traffic states between the time point at which the remote support is received and at the time point at which the remote support request is transmitted is described. When receiving the remote support, the travel management apparatus 21 acquires a position of a peripheral object at the time point of receiving the remote support from the sensor information. Hereinafter, the position of the peripheral object at the time point of receiving the remote support is referred to as an actual position. Further, the travel management apparatus 21 acquires a position of a peripheral object at the time point of receiving the remote support predicted at the time point of transmitting the remote support request from the prediction information temporarily stored in the memory 21b. Hereinafter, the position of the peripheral object acquired from the prediction information is referred to as a predicted position. The travel management apparatus 21 determines that the traffic states correspond when an actual position of a peripheral object corresponds to the predicted position of the peripheral object. When an actual position of a peripheral object does not correspond to the predicted position of the peripheral object, the travel management apparatus 21 determines that the traffic states do not correspond, that is, the traffic state changes from the time point of transmitting the remote support request until the time point of receiving the remote support.

The prediction information is obtained by predicting the position of the peripheral object as probability density or a range. Thus, while the actual position of the peripheral object is represented by a point, the predicted position of the peripheral object acquired from the prediction information is represented by the probability density or the rang. When the predicted position of the peripheral object is represented by the probability density, correspondence between the actual position and the predicted position of the peripheral object means that predicted probability of existence at the actual position of the peripheral object is equal to or greater than a predetermined value. When the predicted position of the peripheral object is represented by the range, correspondence between the actual position and the predicted position of the peripheral object means that the actual position of the peripheral object is included in the range representing the predicted position of the peripheral object. In addition, the comparison of the positions of the peripheral objects is performed for all the peripheral objects detected at the time point of receiving the remote support, and if there is at least one peripheral object of which the actual position does not correspond to the predicted position of that or if there is at least one peripheral object for which the prediction information is not generated, it is determined that the traffic states do not correspond.

Figure 6:
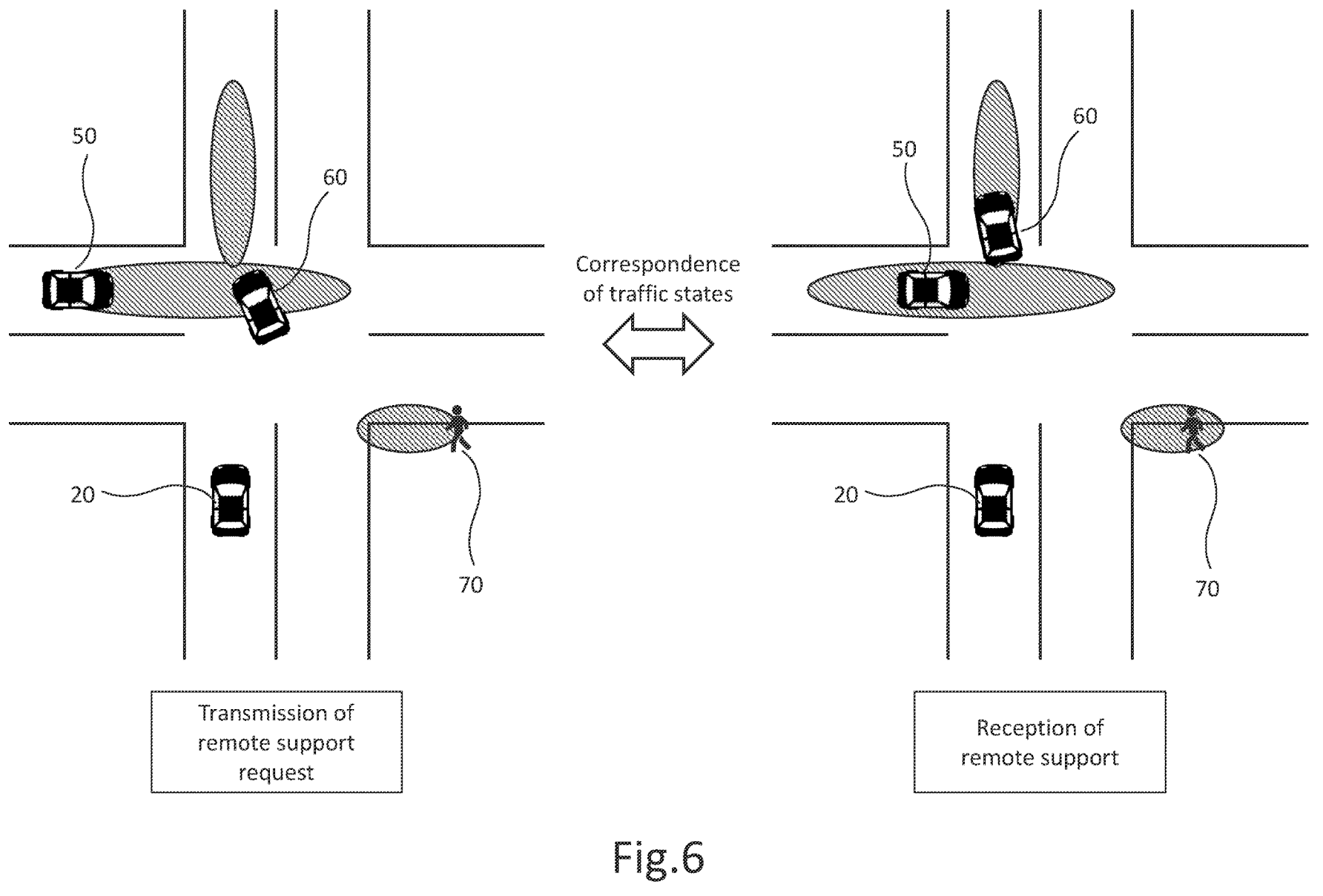

FIG. 6 illustrates an example of a scene in which the traffic state at the time point of receiving the remote support (right side) and the traffic state at the time point of transmitting the remote support request (left side) correspond to each other. FIG. 6 illustrates the vehicle 20, and the vehicle 50, the vehicle 60, and the pedestrian 70, which are the peripheral objects. Here, the predicted positions of the peripheral objects are represented by the ranges. In both the left and right drawings, ellipses filled with oblique lines are the predicted positions of the peripheral objects at the time point of receiving the remote support and are acquired by predicting the future positions of the peripheral objects detected at the time point of transmitting the remote support request.

The positions of the peripheral objects illustrated in the right drawing are the actual positions of the peripheral objects at the time point of receiving the remote support and are acquired from the sensor information of the recognition sensor, and the ellipses filled with oblique lines are the predicted positions of the peripheral objects predicted at the time point of transmitting the remote support request. The travel management apparatus 21 compares the actual positions of the respective peripheral objects illustrated in the right drawing with the predicted positions represented by the ellipses. In the right drawing of FIG. 6, since the respective peripheral objects are in the ellipses filled with oblique lines, it is determined that the traffic states correspond. Since it is considered that the situation at the time of transmitting the remote support request continues until the time of receiving the remote support, the travel management apparatus 21 can adopt the remote support.

Figure 7:
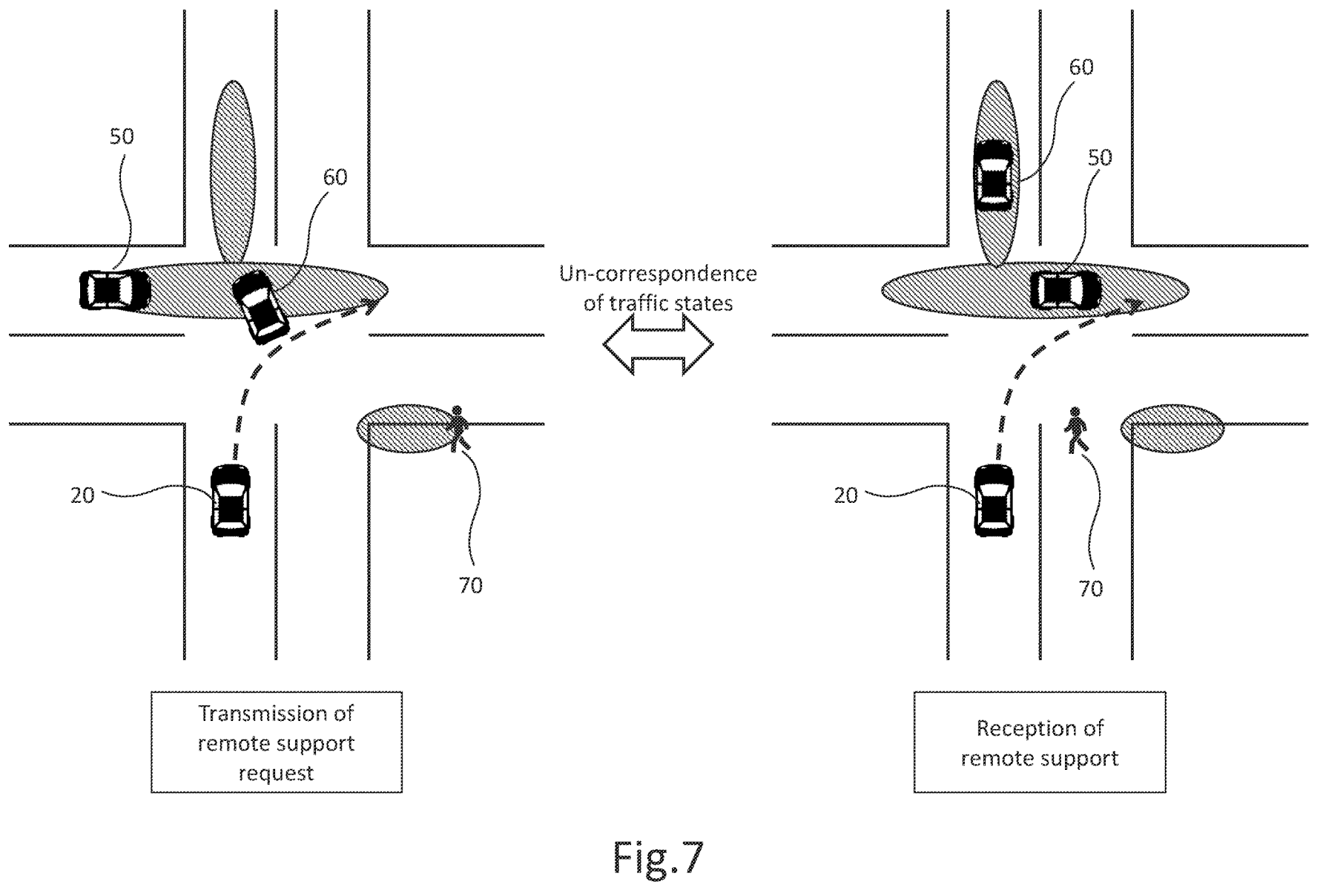
Figure 8:
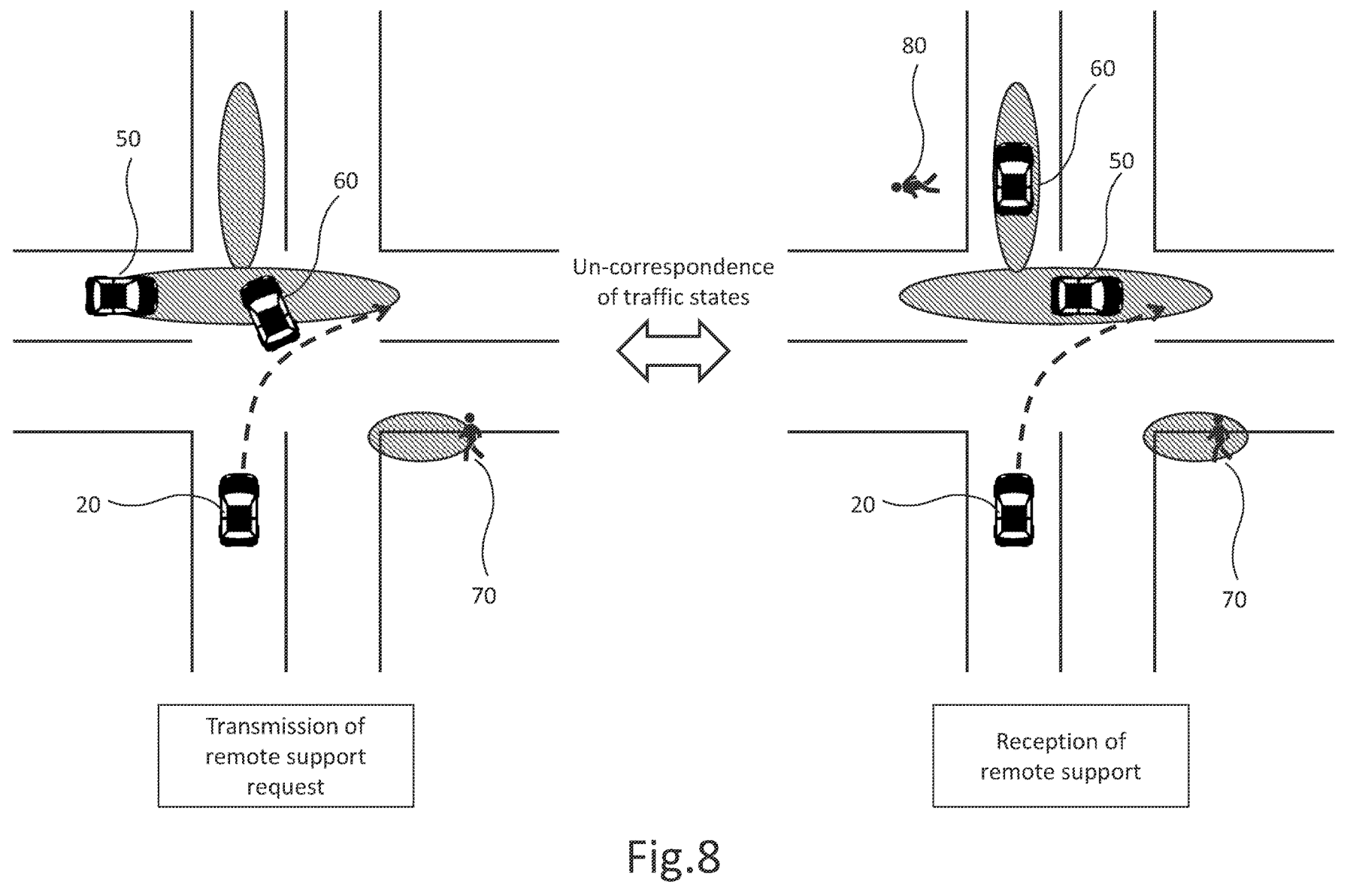

FIGS. 7 and 8 illustrate examples of a scene in which the traffic state at the time point of receiving the remote support and the traffic state at the time point of transmitting the remote support request do not correspond. The predicted positions of the peripheral objects are also represented by the ranges here. Similarly to FIG. 6, ellipses filled with oblique lines are the predicted positions of the peripheral objects at the time point of receiving the remote support and are acquired by predicting the future positions of the peripheral objects detected at the time point of transmitting the remote support request.

In the example of FIG. 7, the pedestrian 70 moves to a position different from the predicted range. Therefore, it is determined that the traffic states do not correspond. In the example of FIG. 8, a pedestrian 80 who is not included in the prediction information newly appears. Therefore, it is determined that the traffic states do not correspond. Since the situation at the time of requesting the remote support has changed until the time of receiving the remote support, the travel management apparatus 21 does not treat the remote support as an effective support.

In this way, by confirming whether the traffic states at the time of requesting the remote support and at the time of transmitting the remote support correspond or not, it becomes possible to prevent an error in the remote support due to a change of the situation caused by delay in the communication. If the traffic states do not correspond, the travel management apparatus 21 gives priority to the control of the vehicle 20 for ensuring safety over the remote support. For example, it is assumed that even when the remote support instructs the vehicle 20 to turn right, the travel management apparatus 21 make the vehicle 20 stop or go slow instead of making the vehicle 20 turn right. In addition, at this time, the travel management apparatus 21 may reject the received remote support and request the remote support from the remote support operator 40 again.

4-2. Method of Calculating Correspondence Degree

The determination of whether the traffic states correspond or not may be performed as follows. The travel management apparatus 21 compares the actual position of the peripheral object at the time of receiving the remote support with the predicted position of the peripheral object predicted at the time of transmitting the remote support request and calculates a value indicating a degree of correspondence. Then, the travel management apparatus 21 determines that the traffic states correspond when the value indicating the degree of correspondence is equal to or larger than a threshold value. When the value is smaller than the threshold value, the travel management apparatus 21 determines that the traffic states do not correspond. Here, the value indicating the degree of correspondence of the traffic states between the time of receiving the remote support and the time of transmitting the remote support request is defined as a correspondence degree X. Examples of a method of calculating the correspondence degree X is described.

The prediction information for each peripheral object i can be represented by $\varphi i$ (x, v, t). $\varphi i$ is a function that outputs a fixed value when a position x and a velocity v of the peripheral object i at time t are given and a larger output value means a larger degree of correspondence to the prediction information. $\varphi i$ may be a probability distribution or a function determined in accordance with the predicted range of the position of the peripheral object i. When the prediction information for the peripheral object i is not generated, $\varphi i$ equals zero. The correspondence degree X is calculated by the following equation.

$$X=F\{\varphi_0(x,v,t),\dots,\varphi_i(x,v,t),\dots,\varphi_n(x,v,t),x_0(t),\dots,$$
$$x_i(t),\dots,x_n(t),v_0(t),\dots,v_i(t),\dots,v_n(t)\}$$

Here, xi (t) is the position of the peripheral object i at the time t, vi (t) is the velocity of the peripheral object i at the time t, and F is a function which outputs a discrete or continuous value as a result of calculation based on inputs of $\varphi i$, x, and v.

As the function F, the following functions are exemplified. In the first example, the function outputs zero when any one or more of the values of $\varphi i$ (t, xi (t), vi (t)) calculated from the positions xi (t) and the velocity vi (t) of the respective peripheral objects i are smaller than a predetermined value, and outputs one when $\varphi i$ (t, xi (t), vi (t)) for all peripheral objects i are equal to or larger than the predetermined value.

In the second example, the function outputs a minimum value of $\varphi i$ (t, xi (t), vi (t)) calculated for each peripheral object i. In this case, an equation for calculating the correspondence degree X is expressed as the following.

$$X=\mathrm{MIN}\{(\varphi_0(x_0(t),v_0(t),t),\dots,\varphi_i(x_i(t),v_i(t),t),\dots,$$
$$\varphi_n(x_n(t),v_n(t),t)\}$$

In the first and second examples, the correspondence or un-correspondence of the traffic states is determined based on the position and the velocity of the peripheral object which most deviates from the prediction among the peripheral objects i. Accordingly, even when the number of the peripheral objects is large, it is possible to more accurately determine whether an unexpected situation occurs.

In the third example, F is a function for calculating the P value. The P-value represents the probability that a chi-squared value at the time of receiving the remote support statistically occur. The chi-square value is calculated using the actual position (observed value) and the predicted position (expected value) of the peripheral object. In this case, $\varphi_i$ is the probability distribution. As described above, by calculating the correspondence degree X as a certain fixed value, it is possible to quantitatively evaluate the degree of correspondence of the traffic states between the time point of transmitting the remote support request and the time point of receiving the remote support.

5. Functional Configuration

Figure 9:
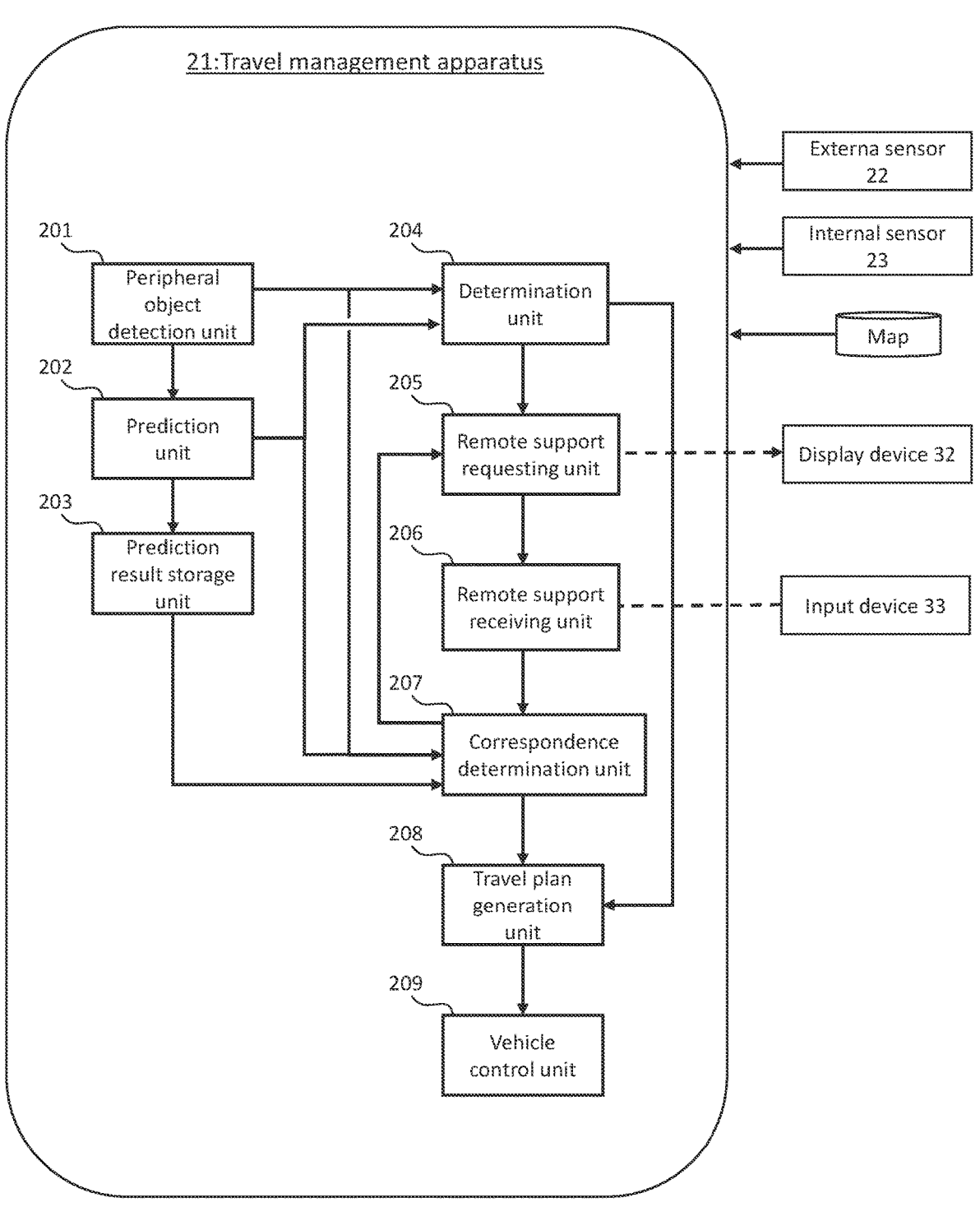
FIG. 9 is a block diagram illustrating an example of a configuration of the travel management apparatus according to an embodiment of the present disclosure.

Functions of the travel management apparatus 21 are described with reference to FIG. 9. Each functional unit is realized by the processor 21a executing the program 21c.

A peripheral object detection unit 201 acquires sensor data from the recognition sensor and detects the peripheral object. The detection of the peripheral object is performed by, for example, acquiring the camera image captured by the camera and detecting a vehicle, a pedestrian, or the like by image recognition of the camera image. Alternatively, the detection of the peripheral object may be performed by acquiring point group data from the LiDAR and clustering the acquired point group data. Information about the peripheral object detected by the peripheral object detection unit 201 is input to a prediction unit 202, a determination unit 204, and a correspondence determination unit 207.

The prediction unit 202 predicts future motion of the peripheral object detected by the peripheral object detection unit 201 and outputs the result of the prediction to the determination unit 204. In addition, the prediction unit 202 generates the prediction information and temporarily stores the prediction information in a prediction result storage unit 203. The prediction information includes a time code showing the time at which the prediction is performed.

The determination unit 204 determines whether traveling by autonomous travel is possible or not based on the information about the peripheral object detected by the peripheral object detection unit 201 and the result of prediction output from the prediction unit 202. Determination performed by the determination unit 204 includes determination of whether the vehicle 20 can start or not or whether the vehicle 20 can enter the intersection or not. When it is determined that the vehicle 20 can travel by autonomous travel, for example, when it is determined that the vehicle 20 can enter the intersection or start, the determination unit 204 inputs the determination into a travel plan generation unit 208. When it cannot be determined that the vehicle 20 can travel by autonomous travel and it is determined that the remote support is necessary, the determination unit 204 inputs the result of the determination into a remote support requesting unit 205.

When the result of the determination showing that the remote support is necessary is input from the determination unit 204, the remote support requesting unit 205 transmits the remote support request to the remote support terminal 30. The remote support requesting unit 205 also transmits the information for the remote support operator 40 to perform the remote support to the remote support terminal 30. The transmitted information for performing the remote support includes a time code showing the time at which the information is transmitted. The transmitted information is displayed on the display device 32, and the remote support operator 40 can perform determination for the remote support by referring to the displayed information.

A remote support receiving unit 206 receives remote support which the remote support operator 40 inputs to the input device 33. The received remote support includes the time code of the information displayed on the display device 32 when the remote support operator 40 inputs the remote support to the input device 33. From this time code, it is possible to know when the information which the remote support operator 40 inputs the remote support on the basis of is acquired.

When the remote support receiving unit 206 receives the remote support, the correspondence determination unit 207 acquires the prediction information which has a time code correspondent to the time code included in the remote support among pieces of the prediction information which predicts the position of the peripheral object at the time point of receiving the remote support from the prediction result storage unit 203. The predicted position of the peripheral object can be acquired from the prediction information. Further, the correspondence determination unit 207 acquires the actual position of the peripheral object by acquiring the sensor information from the recognition sensor of the external sensor 22. Then, the correspondence determination unit 207 determines whether the traffic states correspond or not based on comparison between the actual position and the predicted position of the peripheral object. When the traffic states do not correspond, the correspondence determination unit 207 inputs the result of the determination to the remote support requesting unit 205 so that the remote support can be requested again. When the traffic states correspond, the correspondence determination unit 207 inputs the result of the determination into the travel plan generation unit 208 in order to control the vehicle 20 in accordance with the remote support.

The travel plan generation unit 208 generates the travel plan of the vehicle 20 based on map information, a current position, and vehicle speed information. The map information is stored in the memory 21*b* in advance, for example. The current position is acquired from the position sensor of the external sensor 22. The vehicle speed information is acquired from the internal sensor 23. The travel plan is a plan for making the vehicle 20 travel according to the map and includes information necessary for autonomous driving of the vehicle 20, such as a target travel route and target vehicle speed. When the determination that the traffic states correspond is input from the correspondence determination unit 207, the travel plan generation unit 208 generates the travel plan so that the vehicle 20 travels according to the remote support.

A vehicle control unit 209 controls the vehicle 20 so that the vehicle 20 travels in accordance with the travel plan generated by the travel plan generation unit 208.

6. Flowchart

6-1. First Example

Figure 10:
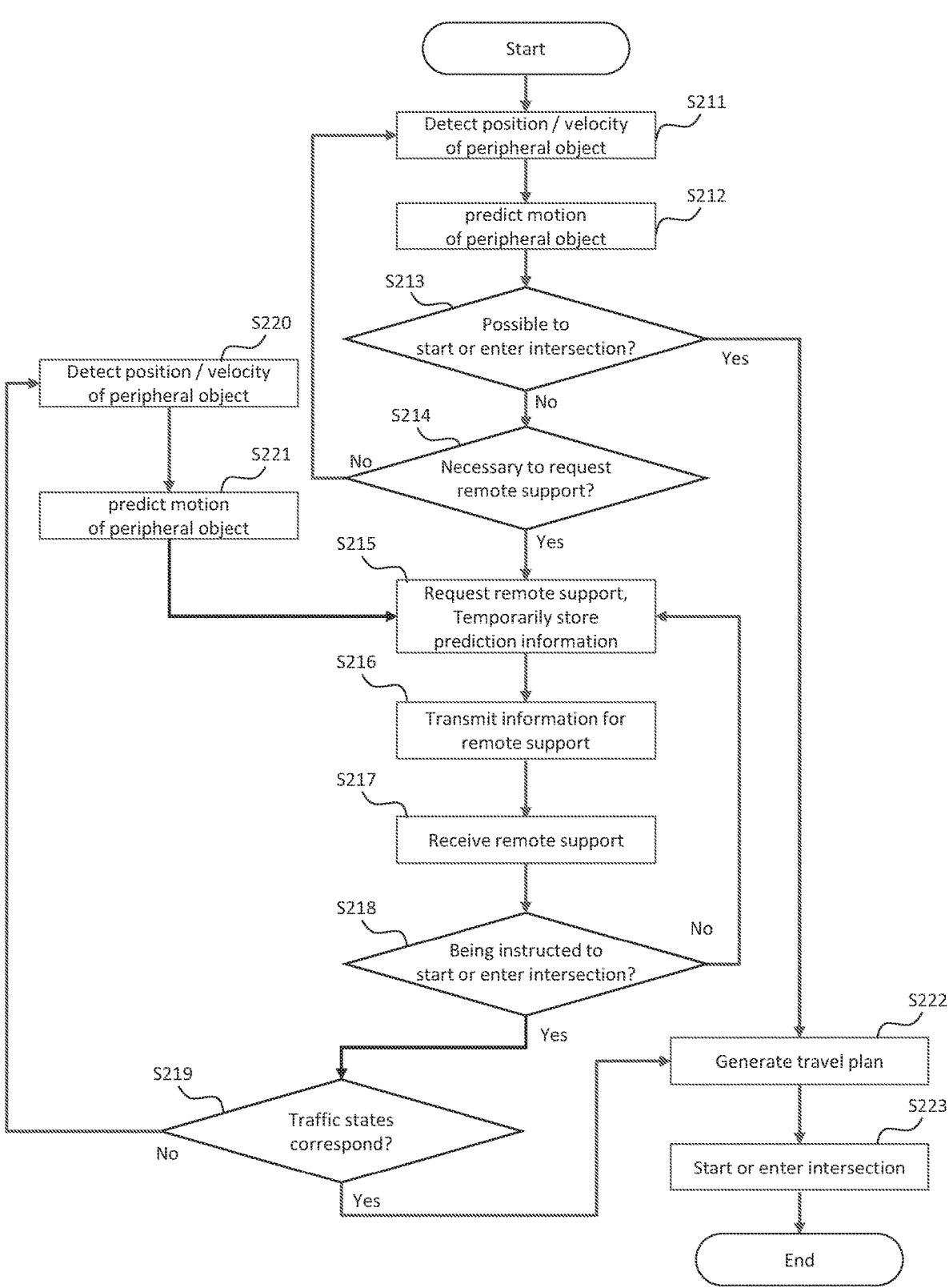
FIG. 10 is a flowchart illustrating an example of processing executed by the travel management apparatus according to the embodiment of the present disclosure.

Processing executed by the travel management apparatus 21 in a scene of entering the intersection, which is an example of the scene in which the remote support is requested, is described. FIG. 10 is a flowchart illustrating an example of processing executed by the travel management apparatus 21. The program 21*c* stored in the memory 21*b* of the travel management apparatus 21 causes the processor 21*a* to execute a series of processing illustrated in the flowchart of FIG. 10.

When the vehicle 20 approaches the intersection, the processor 21*a* of the travel management apparatus 21 starts the series of processing. The travel management apparatus 21 may start the series of processing making the vehicle 20 stop in front of the intersection or may start the series of processing after making the vehicle 20 go slow upon approaching the intersection. In Step S211, the processor 21*a* acquires the sensor information from the recognition sensor and detects the position and the velocity of the peripheral object. After the position and the velocity of the peripheral object are detected, the processing proceeds to Step S212.

In Step S212, the processor 21*a* predicts the future motion of the peripheral object based on the information detected in Step S211. The prediction of the motion of the peripheral object performed by the processor 21*a* in Step S212 includes generation of the prediction information.

In Step S213, the processor 21*a* determines whether the vehicle 20 can start or not or the vehicle 20 can enter the intersection or not. This determination is performed based on the sensor information acquired from the recognition sensor and the result of the prediction generated in Step S212. When it is determined that the vehicle 20 can start or enter the intersection (Step S213; Yes), the processing proceeds to Step S222. When it is not determined that the vehicle 20 can start or enter the intersection (Step S213; No), the processing proceeds to Step S214.

In Step S214, the processor 21*a* determines whether to request the remote support or not. When it cannot be autonomously determined whether the vehicle 20 can start or enter the intersection, the remote support is requested. When the remote support is requested (Step S214; Yes), the processing proceeds to Step S215. When the remote support is not requested (Step S214; No), the processing returns to Step S211.

In Step S215, the processor 21*a* transmits the remote support request and temporarily stores the prediction information generated in Step S211. After the process of Step S215 is executed, the processing proceeds to Step S216.

In Step S216, the processor 21*a* transmits the information for the remote support operator 40 to perform determination for the remote support to the remote support terminal 30. The transmitted information includes the sensor information acquired from the recognition sensor. The transmitted information is displayed on the display device 32. After the information is transmitted, processing proceeds to Step S217.

In Step S217, the processor 21*a* receives the remote support input into the input device 33 by the remote support operator 40 from the remote support terminal 30. After the remote support is received, the processing proceeds to Step S218.

In Step S218, the processor 21*a* determines whether the received remote support instructs to start or enter the intersection or not. When the remote support instructs to start or enter the intersection (Step S218; Yes), the processing proceeds to Step S219. When the remote support does not permit starting or entering the intersection (Step S218; No), the processing returns to Step S215.

In Step S219, the processor 21*a* determines whether the traffic states correspond between the time of transmitting the remote support request and the time of receiving the remote support or not. The determination is performed by comparing the sensor information acquired from the recognition sensor with the prediction information temporarily stored in Step S215. When the traffic states correspond (Step S219; Yes), the processing proceeds to Step S222. When the traffic states do not correspond (Step S219; No), the processing proceeds to Step S220.

In Step S220, the same process as in Step S211 is executed. After the position and the velocity of the peripheral object are detected, the processing proceeds to Step S221.

In Step S221, the same process as in Step S212 is executed. After the prediction is performed, the processing returns to Step S215.

In Step S222, the processor 21*a* generates the travel plan for starting or entering the intersection. The travel plan includes the target position and the target velocity of the vehicle 20. After the travel plan is generated, the processing proceeds to Step S223.

In Step S223, the processor 21*a* controls the vehicle 20 so as to start or enter the intersection. After Step S223 is executed, the series of processing ends.

6-2. Second Example

Figure 11:
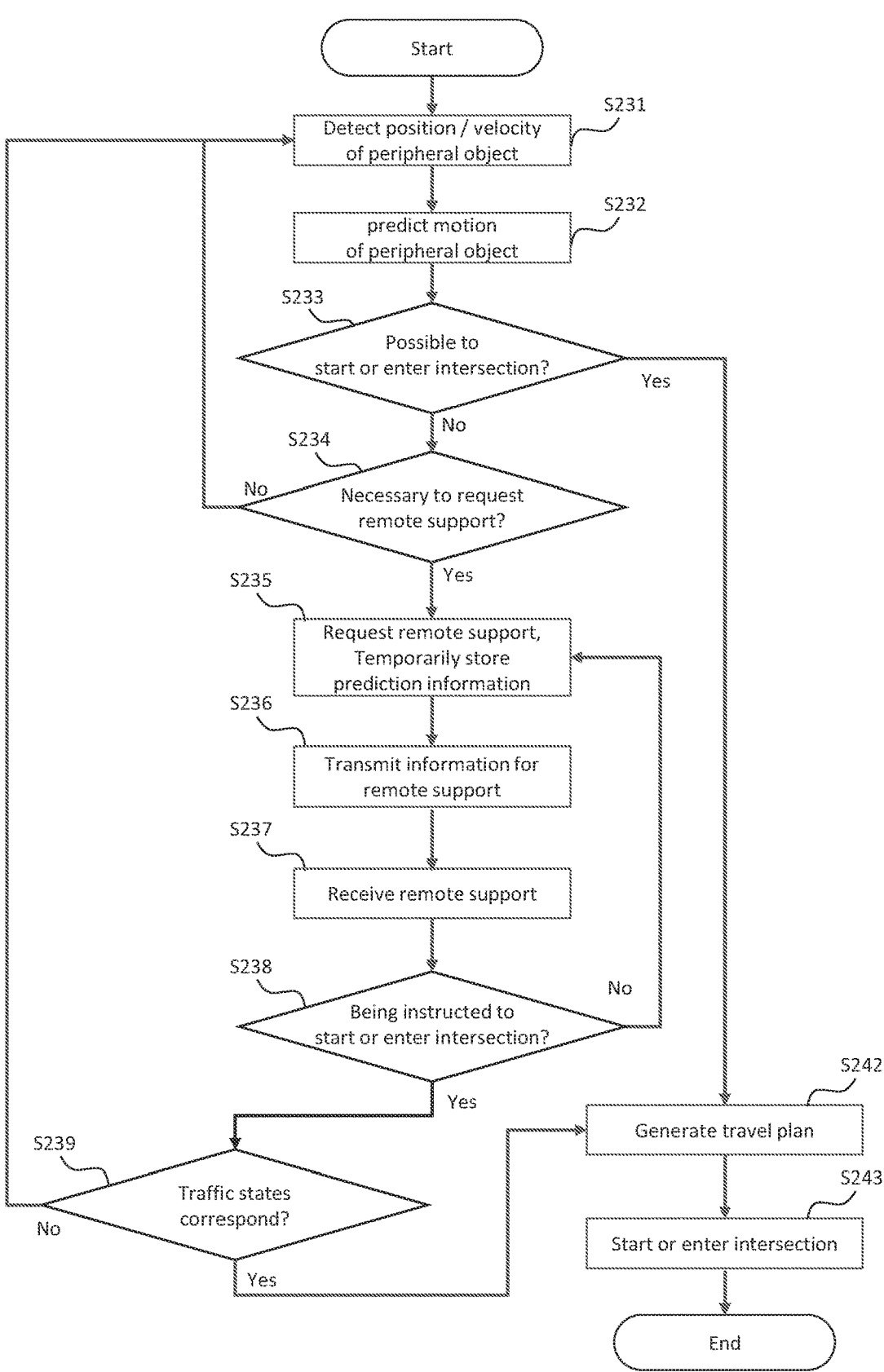
FIG. 11 is a flowchart illustrating another example of processing executed by the travel management apparatus according to the embodiment of the present disclosure.

FIG. 11 is a flowchart illustrating another example of the processing executed by the travel management apparatus 21 when entering the intersection. The program 21*c* stored in the memory 21*b* of the travel management apparatus 21 causes the processor 21*a* to execute a series of processing illustrated in the flowchart of FIG. 11.

The processes from Step S231 to Step S239, Step S242, and Step S243 are the same as the processes from Step S211 to Step S219, Step S222, and Step S223 in FIG. 10. However, when it is determined that the traffic states do not correspond in Step S239 (Step S239; No), the processing returns to Step S231.

When it is determined that the traffic state at the time of receiving the remote support and the traffic state at the time of transmitting the remote support request do not correspond, the remote support may be requested again as illustrated in FIG. 10. Alternatively, as illustrated in FIG. 11, the travel management apparatus 21 may determine whether to start or enter the intersection or not again and request the remote support again when the travel management apparatus 21 cannot determine whether to start or enter the intersection autonomously.

7. Target of Comparison

In the above description, a determination time point when the travel management apparatus 21 determines whether the traffic state correspond with the traffic state at the time of transmitting the remote support request is the time point at which the remote support is received. However, the time point at which the travel management apparatus 21 determines whether the traffic states correspond may not be limited to the time point at which the remote support is received. For example, it may be determined whether the traffic state corresponds with the traffic state at the time point of transmitting the remote support request or not at a time point when predetermined time elapses since the travel management apparatus 21 transmits the remote support request. In this case, for example, the predetermined time is assumed to be average time or maximum time of delay occurring in the communication between the vehicle 20 and the remote support terminal 30.

When the determination time point is the time point at which the remote support is received, the travel management apparatus 21 determines whether the traffic states correspond or not by comparing the actual position with the predicted position of the peripheral object at the time point of receiving the remote support. Similarly, any time point can be the determination time point and it is possible to determine the correspondence or un-correspondence of the traffic states by comparing the actual position with the predicted position of the peripheral object at the determination time point.

In addition, the past time point of which the traffic state becomes a target of comparison is not limited to the time point of transmitting the remote support request. The travel management apparatus 21 can determine correspondence or un-correspondence of the traffic state at the determination time point to the traffic state at an arbitrary time point in the past by using the prediction information generated at the arbitrary time point to acquire the predicted position.

However, when it is determined that the traffic state at a certain determination time point corresponds to the traffic state at a certain past time point, if a period from the certain past time point to the certain determination time point is longer than a period for which the prediction information is generated, the prediction information to be compared is not generated. For example, assuming that the prediction information including prediction up to 50 seconds ahead is generated, even if it is required to determine whether the traffic state at the determination time point corresponds to the traffic state at a past time point more than 50 seconds before the determination time point, the prediction information that predicts the determination time point is not generated at the past time point. In such a case, it is determined that the traffic states does not correspond because the situation at the determination time point is beyond the prediction.

Also in the following description, even when it is described that the travel management apparatus 21 determines whether the traffic state at the time when the remote support is received corresponds to the traffic state at the time when the remote support request is transmitted or not, the determination can be replaced with determination of whether the traffic state at an arbitrary determination time point corresponds to the traffic state at an arbitrary past time point.

8. Modification of Embodiment

8-1. First Modification

Figure 12:
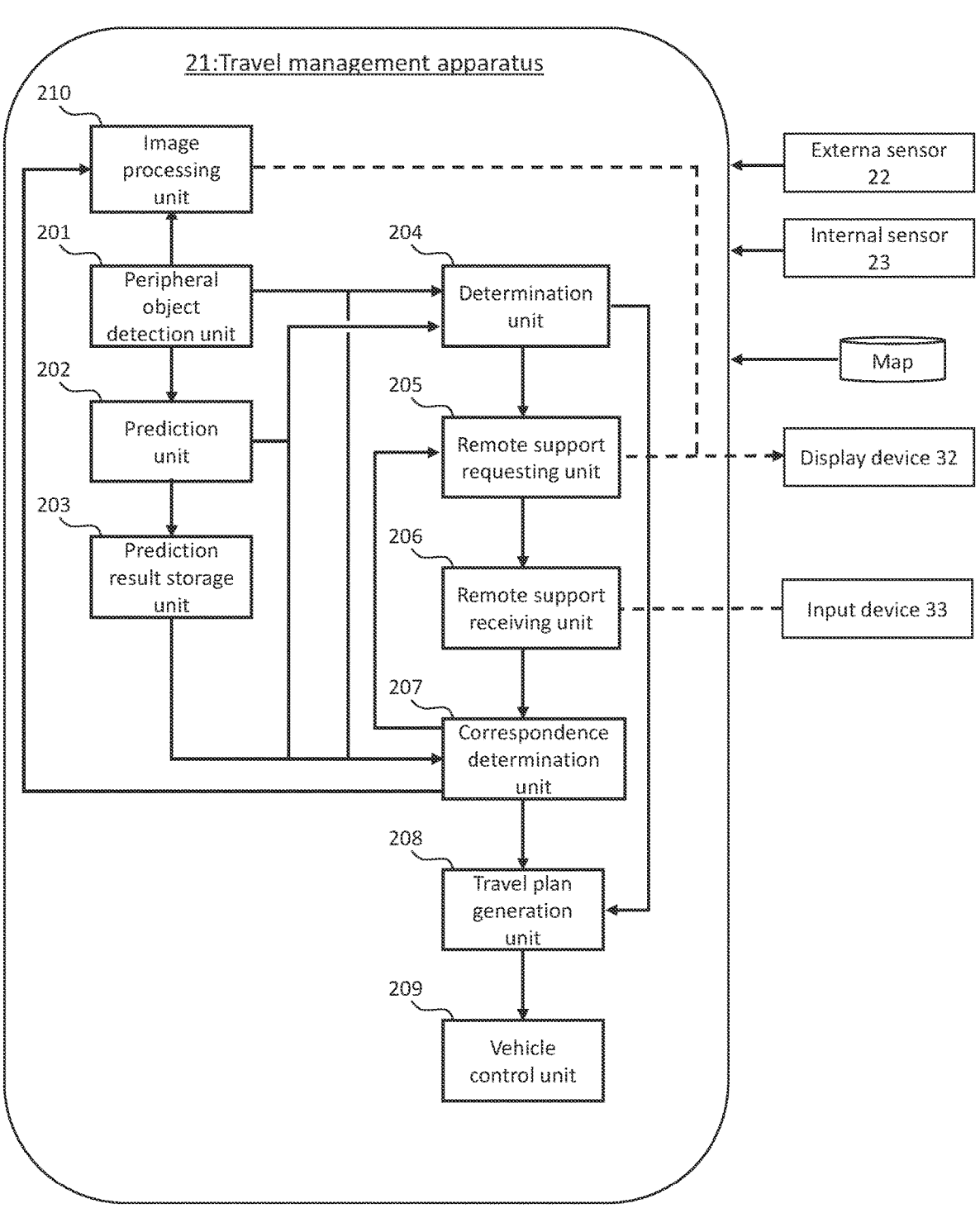
FIG. 12 is a block diagram illustrating an example of the configuration of the travel management apparatus according to a first modification.

FIG. 12 illustrates an example of a configuration of the travel management apparatus 21 according to the first modification. In the first modification, the travel management apparatus 21 comprises an image processing unit 210 in addition to the functional units illustrated in FIG. 9. The image processing unit 210 is a functional unit which processes the camera image so that information about the peripheral object is superimposed on the camera image included in the sensor information. The processed information is transmitted to the remote support terminal 30 and is displayed on the display device 32 together with the information transmitted by the remote support requesting unit 205 or instead of the information transmitted by the remote support requesting unit 205.

For example, the image processing unit 210 may process the image so that three-dimensional information about the peripheral object detected by the peripheral object detection unit 201 using a laser, a LiDAR, or the like is displayed to be superimposed on the camera image. Alternatively, the image may be processed so that a position coordinate or the velocity of the peripheral object are displayed to be superimposed on the camera image. The remote support operator 40 can perform more accurate remote support by performing determination for the remote support with reference to the image processed in this way.

Alternatively, the image processing unit 210 may process the image so that information about the peripheral object whose actual position and predicted position are determined not to correspond by the correspondence determination unit 207 is displayed over the camera image. In this case, for example, the image may be processed so that the peripheral object whose positions are determined not to correspond is highlighted, or the image may be processed so that three-dimensional information about the peripheral object whose positions are determined not to correspond is displayed in the camera image. The processed image is transmitted to the remote support terminal 30 when the remote support is requested again.

Here, the peripheral object whose positions do not correspond is the peripheral object whose actual position is not included in the range of the predicted position, the peripheral object whose probability of existence predicted at the actual position is less than the predetermined value, or the peripheral object whose value of φi described in Chapter 4-2 is less than the predetermined value. In this way, by making the information about the peripheral object existing at the position deviated from the predicted position conspicuous when requesting the remote support again, it is possible to reduce time required for the remote support operator 40 to determine the remote support.

8-2. Second Modifications

The second modification can be taken in a case where the remote support is performed when the vehicle 20 enters the intersection. Even if it is determined that the remote support is effective when the vehicle 20 starts entering the intersection, there is a possibility that a situation that is not intended by the remote support operator 40 at the time of the remote support newly occurs in a case where it is determined that the traffic state changes after the vehicle 20 enters the intersection. Therefore, the travel management apparatus 21 continuously determines whether the traffic states correspond not only at the time of receiving the remote support but also after the vehicle 20 enters the intersection. That is, the determination about the correspondence or un-correspondence of the traffic states is repeated at a predetermined interval even after the vehicle enters the intersection. In this case, the predicted position to be compared with the actual position of the peripheral object may be the predicted position acquired from the prediction information generated at a time point predetermined time before the determination time point or may be the predicted position acquired from the prediction information generated at the time of transmitting the remote support request or at the time of receiving the remote support.

When it is determined that the traffic state changes after the vehicle 20 enters the intersection, the travel management apparatus 21 requests remote support again without continuing making the vehicle 20 enter the intersection. At this time, the travel management apparatus 21 stops or slows down the vehicle 20 to ensure safety. Such determination of correspondence or un-correspondence of the traffic states is continued until the vehicle 20 completely enters the intersection. As a result, it is possible to enhance safety when the vehicle 20 passes through the intersection. After the vehicle 20 completely enters the intersection, because it is considered that it is safer to make the vehicle 20 pass through the intersection rather than to make the vehicle 20 stop or go slowly, the determination of correspondence of the traffic states like this ends, and the travel management apparatus 21 controls the vehicle 20 by autonomous travel to make the vehicle 20 pass through the intersection.

8-3. Third Modifications

In the third modification, in order to determine the correspondence of the traffic states, the predicted positions of the peripheral object are compared instead of comparing the actual position with the predicted position of the peripheral object. Two predicted positions which predict the same future time point are compared. One is the predicted position acquired from the prediction information generated at the time of transmitting the remote support request, and the other is the predicted position acquired from the prediction information generated at the time of receiving the remote support. The same future time point may be, for example, a time point that is predetermined time ahead of the determination time point or a time point at which the vehicle 20 is predicted to reach a certain point on the road. For example, in a case where the remote support is performed when the vehicle 20 passes through the intersection, a time point at which the vehicle 20 is predicted to reach the center of the intersection or a time point at which the vehicle 20 is predicted to finish passing through the intersection may be the same future time point. In this case, the correspondence determination unit 207 can determine which time point is to be the same future time point by acquiring the predicted time until the vehicle 20 reaches a certain point on the road from the travel plan generation unit 208.

In the third modification, the predicted position of the peripheral object is also represented by the probability density or the range. When the predicted position of the peripheral object is represented by the range, correspondence of the predicted positions means that the predicted position generated at the time of receiving the remote support is included in the range of the predicted position generated at the time of transmitting the remote support request. Alternatively, it may be determined that the predicted positions correspond when a predetermined range or more of the predicted positions generated at the time of receiving the remote support is included in the range of the predicted position generated at the time of transmitting the remote support request. When the predicted position of the peripheral object is represented by the probability density, it is determined that the two predicted positions correspond when the amount of overlap between the probability density distribution generated at the time of receiving the remote support and the probability density distribution generated at the time of transmitting the remote support request is larger than a predetermined amount.

Figure 13:
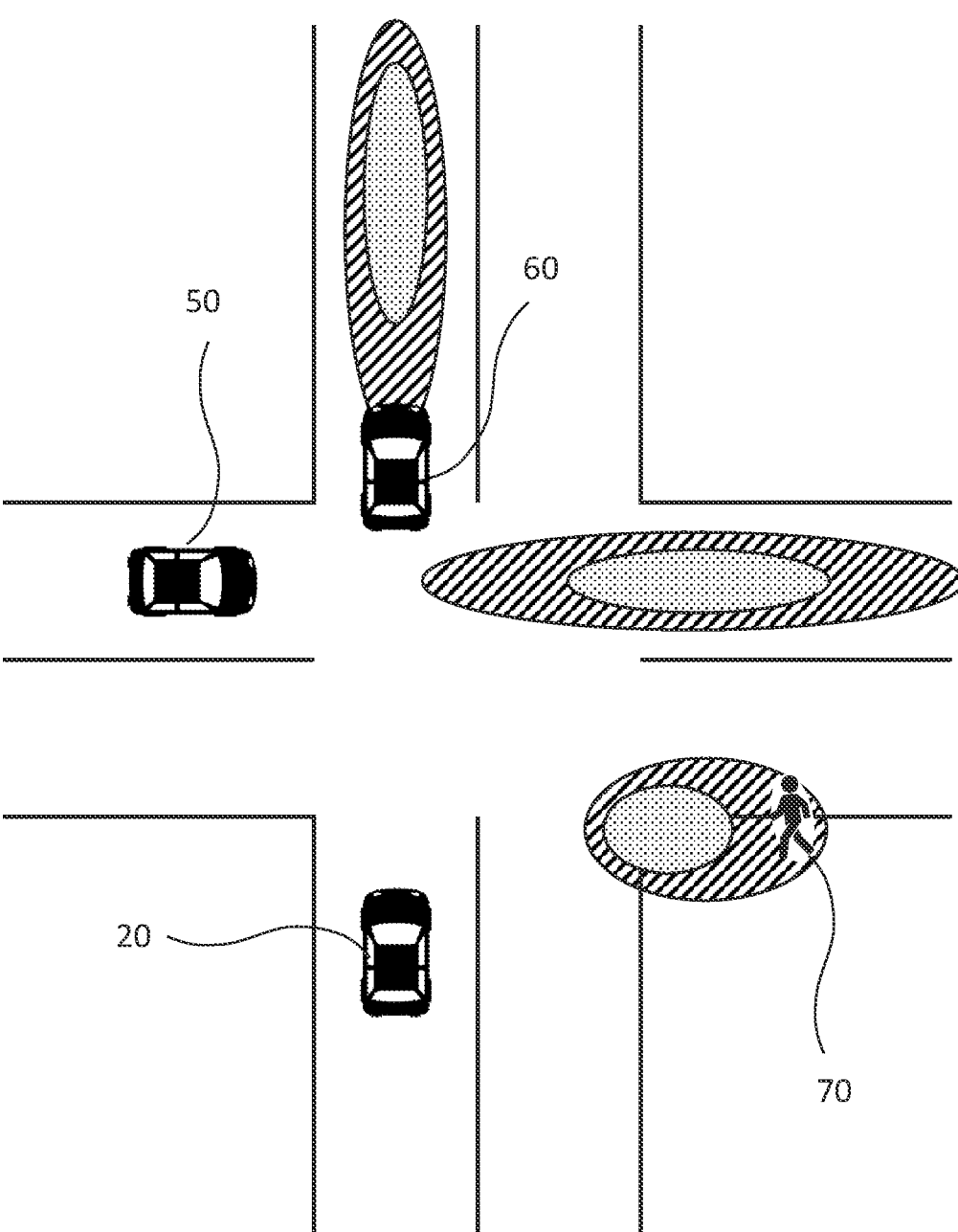
FIG. 13 is a diagram for explaining determination about correspondence of the traffic states in a second modification.

FIG. 13 illustrates an example of the predicted positions to be compared in the third modification. Here, the predicted positions of the peripheral objects are represented by the ranges. Dotted ellipses represent the predicted positions of the respective peripheral objects generated at the time of receiving the remote support, and Ellipses filled with oblique lines represent the predicted positions of the respective peripheral objects generated at the time of transmitting the remote support request. These predicted positions generated at both time are obtained by predicting the positions of the peripheral objects at the time when the vehicle 20 is predicted to finish passing through the intersection. In the example of FIG. 13, each dotted ellipse is included in the ellipse filled with oblique lines. That is, the two predicted positions correspond, so it is expected that the traffic states continue to correspond until the vehicle 20 finishes passing through the intersection.

9. Conclusion

As described above, when receiving the remote support, the travel management apparatus according to the embodiment of the present disclosure performs control of the vehicle in accordance with the remote support upon confirming that the traffic state at the time when the remote support is received corresponds to the traffic state at the time when the remote support request is transmitted. As a result, it is possible to prevent the vehicle from traveling in accordance with the remote support which becomes no longer effective due to the change in the situation caused by the delay and to improve the safety of traveling of the vehicle.

In addition, in the embodiment of the present disclosure, the effectiveness of the remote support is determined based on correspondence or un-correspondence of the traffic states, instead of simply based on the amount of the delay time of the communication. As a result, the accuracy of the determination is improved. It is possible to determine that the remote support is not effective when the situation is greatly changed even if the communication delay is small. On the other hand, when the change in the situation is small, it is possible to adopt the remote support even if the communication delay increases. Therefore, it is also possible to improve the efficiency in traveling of the vehicle. In this way, it is possible to increase the robustness against the delay and appropriately deal with the delay even when the delay occurs.

What is claimed is:

1. An apparatus that manages travel of a vehicle having an autonomous travel function, the apparatus comprising:
one or more memories storing one or more programs; and
one or more processors coupled with the one or more memories,
wherein the one or more programs are configured to cause the one or more processors to execute:
acquiring sensor information at a first time from a recognition sensor mounted on the vehicle, including a position of a peripheral object, the peripheral object being an object existing around the vehicle;
generating prediction information showing a predicted position of the peripheral object at a future time point based on the sensor information acquired at the first time;

transmitting a remote support request to a remote support operator based on the sensor information acquired at the first time;
receiving a remote support given in response to the remote support request by the remote support operator at a determination time after the first time;
acquiring sensor information at the determination time, including a second position of the peripheral object;
determining that the received remote support is effective based on the second position of the peripheral object at the determination time corresponding to the predicted position of the peripheral object based on the sensor information acquired at the first time; and
making the vehicle autonomously travel in accordance with the remote support in response to determining that the remote support is effective.

2. The apparatus according to claim 1, wherein the prediction information that is a target of determining that the received remote support is effective is prediction information generated at a time point at which the remote support request is transmitted.

3. The apparatus according to claim 1, wherein
the determination time is a time point at which predetermined time has elapsed since the remote support request has been transmitted.

4. The apparatus according to claim 1, wherein the sensor information acquired at the first time includes the position of the peripheral object and a velocity of the peripheral object.

5. The apparatus according to claim 4, wherein the generating the prediction information comprises generating a probability distribution corresponding to a range of predicted positions of the peripheral object at the future time point based on the velocity and the position of the peripheral object at the first time, and
wherein the determining that the received remote support is effective comprises:
obtaining a degree of correspondence based on the position of the peripheral object at the determination time compared to the probability distribution, and
determining that the received remote support is effective based on the degree of correspondence being equal to or greater than a predetermined threshold.

6. A method for managing travel of a vehicle having an autonomous travel function, the method comprising:
acquiring sensor information at a first time from a recognition sensor mounted on the vehicle, including a position of a peripheral object, the peripheral object being an object existing around the vehicle;
generating prediction information showing a predicted position of the peripheral object at a future time point based on the sensor information acquired at the first time;
transmitting a remote support request to a remote support operator based on the sensor information acquired at the first time;
receiving a remote support given in response to the remote support request by the remote support operator at a determination time after the first time;
acquiring sensor information at the determination time, including a second position of the peripheral object;
determining that the received remote support is effective based on the second position of the peripheral object at the determination time corresponding to the predicted position of the peripheral object based on the sensor information acquired at the first time; and making the vehicle autonomously travel in accordance with the remote support in response to determining that the remote support is effective.

7. A non-transitory computer-readable storage medium storing a program for managing travel of a vehicle having an autonomous travel function, the program being configured to cause a processor to execute:

acquiring sensor information at a first time from a recognition sensor mounted on the vehicle, including a position of a peripheral object, the peripheral object being an object existing around the vehicle;

generating prediction information showing a predicted position of the peripheral object at a future time point based on the sensor information acquired at the first time;

transmitting a remote support request to a remote support operator based on the sensor information acquired at the first time;

receiving a remote support given in response to the remote support request by the remote support operator at a determination time after the first time;

acquiring sensor information at the determination time, including a second position of the peripheral object;

determining that the received remote support is effective based on the second position of the peripheral object at the determination time corresponding to the predicted position of the peripheral object based on the sensor information acquired at the first time; and making the vehicle autonomously travel in accordance with the remote support in response to determining that the remote support is effective.

* * * * *